US008385194B2

(12) United States Patent
Lange

(10) Patent No.: US 8,385,194 B2
(45) Date of Patent: *Feb. 26, 2013

(54) QUALITY OF SERVICE ADMISSION CONTROL NETWORK

(75) Inventor: Andrew S. Lange, Culver City, CA (US)

(73) Assignee: Alcatel Lucent, Paris (FR)

( * ) Notice: Subject to any disclaimer, the term of this patent is extended or adjusted under 35 U.S.C. 154(b) by 1027 days.

This patent is subject to a terminal disclaimer.

(21) Appl. No.: 11/717,909

(22) Filed: Mar. 13, 2007

(65) Prior Publication Data

US 2008/0225716 A1 Sep. 18, 2008

(51) Int. Cl.
*G01R 31/08* (2006.01)
*H04L 12/28* (2006.01)
*H04B 7/212* (2006.01)

(52) U.S. Cl. .............. 370/230; 370/395.21; 370/395.42; 370/444

(58) Field of Classification Search ........................ None
See application file for complete search history.

(56) References Cited

U.S. PATENT DOCUMENTS

| | | | |
|---|---|---|---|
| 7,412,598 B1* | 8/2008 | Gleichauf | 713/155 |
| 2003/0028641 A1* | 2/2003 | Zhang et al. | 709/226 |
| 2003/0028670 A1* | 2/2003 | Lee et al. | 709/241 |
| 2003/0212787 A1* | 11/2003 | Qiu et al. | 709/224 |
| 2004/0132451 A1* | 7/2004 | Butehorn et al. | 455/445 |
| 2006/0039364 A1* | 2/2006 | Wright | 370/352 |
| 2006/0168336 A1* | 7/2006 | Koyanagi et al. | 709/240 |
| 2006/0194601 A1* | 8/2006 | Nandagopalan | 455/515 |
| 2007/0019544 A1* | 1/2007 | Ashwood Smith et al. | 370/230 |
| 2008/0075116 A1* | 3/2008 | Holierhoek et al. | 370/468 |
| 2008/0130501 A1* | 6/2008 | Bailey et al. | 370/235 |
| 2008/0144502 A1* | 6/2008 | Jackowski et al. | 370/235 |

* cited by examiner

*Primary Examiner* — Kwang B Yao
*Assistant Examiner* — Jutai Kao
(74) *Attorney, Agent, or Firm* — Wolff & Samson, PC

(57) ABSTRACT

A network includes an advanced bandwidth manager (ABM) to manage loading when a network nears or exceeds its capacity due to changes in the network, e.g., component failures or incremental growth. The ABM gathers strategic information from remote listeners about how traffic is being routed over the whole network, and is abstracted into point-to-point tables. The information gathered also helps to provide long term service planning. Autonomous policy enforcement points (PEP's) provide short term controls on their own. Intelligent action can be taken by the ABM through the PEP's by downloading admission tables based in the point-to-point abstractions. The goal is to keep the highest level of service up for the most users and prevent total failures. Requested network connections are either admitted or denied to these ends.

12 Claims, 4 Drawing Sheets

QUALITY OF SERVICE ADMISSION CONTROL NETWORK

BACKGROUND OF THE INVENTION

1. Field of the Invention

The present invention relates to computer network construction and operation, and in particular to network connection admission control (NCAC) for end-to-end quality of service (QoS) in packet-switched networks.

2. Description of the Prior Art

Business pressures to reduce the capital and operating expenses of building and operating separate network infrastructures have resulted in a general migration by service providers toward a common multi-service Internet protocol/multi-protocol label switching (IP/MPLS) network. Previously, such service providers maintained and operated separate legacy circuit-switched and packet-switched networks. Voice services were supported over the circuit-switched Public Switched Telephone Network (PSTN). Packet-switched networks, such as Frame Relay (FR) and Asynchronous Transfer Mode (ATM), were used in virtual private networks (VPN) for enterprises. These service providers are now migrating legacy Layer-2 and Layer-3 services to converged IP/MPLS-enabled IP networks.

Since the days of the telegraph there has been a need for a network system to provide sufficient quality to an end-user's application. Over time, two main techniques have evolved, Traffic Prioritization and Network Connection Admission Control (NCAC). Traffic Prioritization transmits some traffic ahead of other traffic. In the case of congestion in the network traffic marked with a higher-priority gets through, while lower priority traffic gets queued or dropped. This technique is quite effective, especially if the low-priority traffic is loss-insensitive, such as email which will be retransmitted at a later time if it cannot get through now. However, when the congestion is caused by traffic all in the same class then quality will degrade across all sessions or calls using that traffic class. When this traffic belongs to an application that is sensitive to loss, such as voice or video, the application cannot recover and user experience degrades across all sessions traversing the congested portion of the network. For these cases, an NCAC technique is used, perhaps in addition to a traffic prioritization technique.

Historically, in a circuit-switched network, such as the traditional voice telephony network, NCAC is inherent in the technology. An entire circuit is nailed up from end to end. Of course not all the bandwidth in that circuit is used at all times. In fact, for voice, very little is used. By allocating entire circuits, or time-slots in a TDM scheme such as SONET or SDH, quality can be preserved. But the cost of over allocating resources to handle the offered load is significant.

Ensuring a circuit-switched network recovers from failure requires reserving a backup path between each pair of nodes in the network, SONET's working and protect paths. This doubles the resources required to support the network's load, and is quite expensive.

With the evolution of networks, packet and cell-switched networks have evolved which allow the previously tied-up network resources to be used more efficiently through dividing the data up into bits or packets which can then be transmitted through the network. With these small atoms of data, previously unused resources can be used, radically increasing the efficiency of the network. In addition, doubling the bandwidth on every hop with a working and protect path in a ring is no longer required.

Intelligent interior gateway routing protocols (IGP's), such as OSPF and ISIS can be used to reroute traffic in the case of failure along a multitude of different paths. The downside of packet-switched networks is that their efficiency and robustness come without a clear mechanism to allocate resources required by the end applications, an NCAC system. Various NCAC systems have been proposed, however they all have significant shortcomings. Either they attempt to emulate the PSTN's circuit model, which comes with attendant problems of over provisioning, signaling load and complexity, or they attempt to pass all calls through a central device, which has problems in scaling, support and complexity. What is missing is an NCAC mechanism that does not succumb to the same problems that existing mechanisms do.

Network reliability and availability rank among the top concerns of most service providers. Maintaining revenue-generating service offerings is extremely important to them. For example, a one minute network outage that affects a hundred customers could cost a service provider several hundred thousand dollars. The high availability of packet-switched networks is a prerequisite to offering reliable and profitable carrier-class services.

A typical IP/MPLS-based network comprises routers and switches interconnected by fiber links and other transport facilities. Customers connect to the backbone (core) network through multi-service provider edge (PE) routers. Core routers in the backbone provide high-speed transport and connectivity between the PE routers. PE router line-cards and physical interfaces provide ATM, FR, Ethernet, IP/MPLS VPN's, and other Layer-2 and Layer-3 services. A switching fabric, at the heart of a router, is used to switch packets between the line cards.

IP routing protocols are used to advertise network topology, exchange routing information, and calculate forwarding paths between routers within and between network routing domains. IP routing protocols include Open Shortest Path First (OSPF), Intermediate System-to-Intermediate System (IS-IS), and Border Gateway Protocol (BGP).

IP/MPLS signaling protocols are used to establish, maintain, and release label-switched paths (LSP). MPLS-labels can be used in a "Switching" or "Outer" label context, where the router uses the label to determine the next-hop, or they can be used in a "Service" or "Inner" label context where the router uses the label to determine which VPN the packet belongs to. Including redundant network elements adds to the overall network cost. So service providers use different levels and types of fault tolerance in the edge and core network. Alternative paths can be quickly established around a failure point. Extra routers and links can be used to provide additional fault tolerance.

On the network's edge, thousands of customers may be connected through a single edge router. It represents a single point of failure, and is often the most vulnerable point of their network. Redundant control processor cards, line cards, and links, in each edge router can significantly improve fault tolerance.

Customer downtime can result from failures of access ports, edge links, edge routers, backbone transport facilities, or the core routers. Generally, the core network will provide a higher level of fault tolerance than will the edge network. The edge router is an important network element because it routes traffic to/from multiple customers to the core network. Improving the availability of edge routers is extremely important.

The main job of a network is satisfying customer expectations, e.g., availability of service according to service-level agreements (SLA). A network point-of-view deals with reducing network equipment and operation costs. The best networks satisfy service reliability and availability objectives while minimizing network equipment and operational costs.

The rush in the telecomm market's move towards IP/MPLS based networks left questions about service delivery and how to assure end-user quality of experience. Packet-switched networks do not provide the assurances inherent in its predecessor ATM or TDM networks. Many protocols and technologies are now being added to packet-switched networks to approximate some aspects of the ATM or TDM environment.

Admission controls allow services only if the network state can handle the required bandwidth without affecting existing traffic. Such is a simple idea, but very complex in its implementation, given the variability of packet-switched networks.

Admission control within the IP/MPLS core is materializing slowly but steadily. Topology learning and monitoring, and bandwidth reservation are essential. This is far more complicated than learning a static TDM network. IP networks by their nature are dynamic, so a dedicated listener is required to keep track of the changing topology. In VoIP and other applications, session based admission is not reasonable due to the many sessions required.

Admission controls are only needed to handle cases where the network congests. If a network never congests, it does not need an admission mechanism. But real-world networks are run much closer to their limits because of construction costs and/or usage growth. There is a need for methods and equipment to provide network connection admission control (NCAC) for end-to-end quality of service (QoS).

SUMMARY OF THE INVENTION

Briefly, a network embodiment of the present invention comprises an advanced bandwidth manager (ABM) to manage loading when a network nears or exceeds its capacity due to changes in the network, e.g., component failures or incremental growth. The ABM gathers strategic information from remote listeners about how traffic is being routed over the whole network, and abstracts this into point-to-point tables. The information gathered also helps to provide long term service planning. Autonomous policy enforcement points (PEP's) provide short term controls on their own. Intelligent action can be taken by the ABM through the PEP's by downloading admission tables based in the point-to-point abstractions. The goal is to keep the highest level of service up for the most users and prevent total failures. Requested network connections are either admitted or denied to these ends.

An advantage of the present invention is that a network is provided that can deliver acceptable quality for each service at an economical cost to end users.

Another advantage of the present invention is a networking method is provided for good planning and provisioning, so there will be enough fundamental bandwidth available to serve the demand, and provide effective integrated tools to plan for future growth.

A further advantage of the present invention is that a network is provided for marking and giving priority treatment to important applications' traffic, so congestion is handled correctly, and priority traffic is sent first.

A still further advantage of the present invention is that a network is provided with bandwidth management of important applications.

A further advantage of the present invention is a network is provided for session or call admission control in the bandwidth management of important applications, so when there is congestion within a traffic class some users are denied service to preserve the quality of experience for the majority of users.

Another advantage of the present invention is a networking method and system are provided that are scalable, stable, flexible, and application-aware such that they take into account network life-cycles to assure QoS.

A further advantage of the present invention is a networking method and system are provided that are scalable. Providing distributed enforcement of the session-by-session admission decisions, allows the system to handle very large networks. By informing these decisions with a network-wide view, the decisions will be accurate and take the entire network's state into account.

Another advantage of the present invention is a networking method and system are provided that are stable. The present invention does not rely on signaling between an application device, such as a media gateway, and the network forwarding devices, such as routers. This results in less network state, fewer interoperation issues and easier troubleshooting by separating the application from the network plane.

Another advantage of the present invention is a networking method and system are provided that are flexible. The present invention can handle the multiple services a modern operator carries on their converged network. The S/CAC function can maintain a virtual topology for a particular application type, such as voice or video, which allows the operator to carve up their network bandwidth as they wish to support different applications. Carving up the network can be critical in the case of video, whose higher relative priority data, and high resource requirements can starve data completely of resources in the network.

A further advantage of the present invention is a networking method and system are provided that can take into account and interface with the applications demanding resources from the network. This interface can be used by the applications to make more intelligent decisions.

Another advantage of the present invention is a networking method and system are provided that record the network growth and state of the network over time, so information can be fed into a provisioning system to intelligently grow the network and ensure quality as the network grows over time.

These and other objects and advantages of the present invention will no doubt become obvious to those of ordinary skill in the art after having read the following detailed description of the preferred embodiments which are illustrated in the various drawing figures.

IN THE DRAWINGS

DETAILED DESCRIPTION OF THE PREFERRED EMBODIMENT

Figure 1:
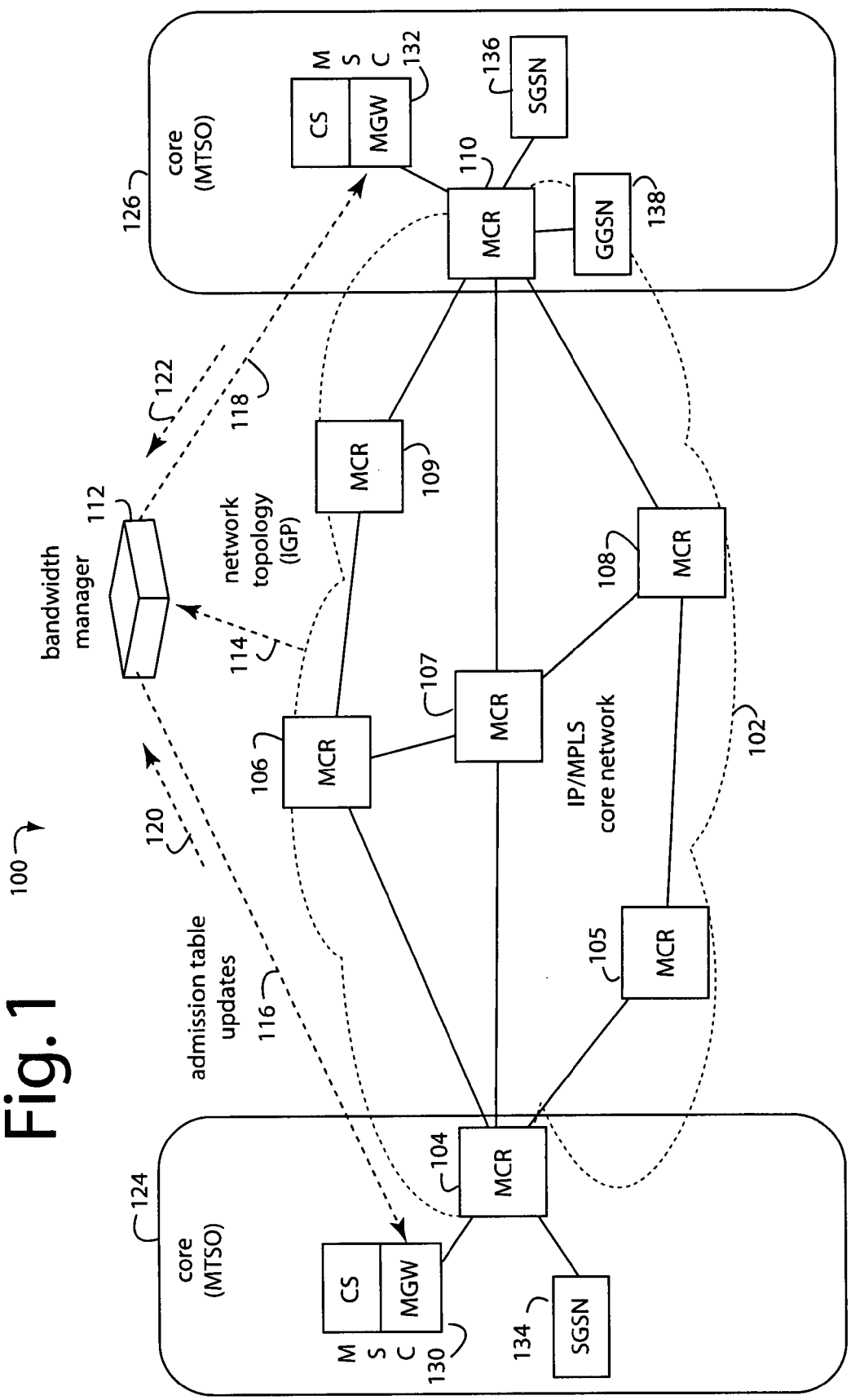
FIG. 1 is a functional block diagram of an packet-switched network embodiment of the present invention for voice in the mobile core.

FIG. 1 represents a network embodiment of the present invention for voice in the Mobile Core, and is referred to herein by the general reference numeral 100. In this application, voice traffic is packetized or simply passed through packet-aware proxies from the edge of an IP or packet-switched core network 102.

Previously, in TDM networks with session/call admission control (S/CAC), admission controls could be computed in each media gateway from the size of the egress paths to corresponding particular destinations because the circuits were dedicated. The admission control could then be implemented with admission table entries that dictated the bandwidth that could be used for each network destination. In packet-switched core network 102, the routing topology and supportable bandwidths on the available paths are constantly changing. Individual media gateways do not have the necessary visibility into the network to monitor the routing topology changes, nor can they coordinate the bandwidth loads that other media gateways would place on shared resources.

In embodiments of the present invention, the network can be IP, MPLS, or IP/MPLS, and the bandwidth reservations to be used for admission control is provided to the media gateways from a central point.

Network 100 supports end-to-end quality-of-service (QoS) for voice traffic in mobile core applications. packet-switched core network 102 comprises many interconnected core routers, as are represented here by mobile core routers (MCR's) 104-110.

An advanced bandwidth manager (ABM) 112 is attached to the core network 102 such that it can receive network topology reports 114 from listeners, e.g., using an interior gateway protocol (IGP). Point-to-point abstractions from the IGP reports 114 are built and organized into path tables. Admission controls for the network as a whole can then be based on these abstractions. Call destinations are abstracted into point-to-point availability lists.

Admission table updates 116 and 118 are pushed to the network edges to inform the local policy enforcement points (MSC's 104, 110) how they should manage their respective bandwidth loads according to application types. If an edge point needs more bandwidth, e.g., to initiate a new call or connection, resource requests 120 and 122 can be forwarded to the ABM 112. Additional resources can be drawn from a resource pool, or borrowed from other provider edges. Such can make more bandwidth available, and updated admission table updates 116 and 118 are pushed to the affected provider edges.

In FIG. 1, mobile telephone switching offices (MTSO's) 124 and 126 represent two edge points in one kind of application service, e.g., mobile core networks. In this application, policy enforcement points (PEP's) are embodied in mobile switching centers (MSC's) 130 and 132, and these include a call server (CS) and a media gateway (MGW). MTSO's 124 and 126 include server general packet radio service (GPRS) support nodes (SGSN's) 134 and 136, and a typical gateway GPRS support node (GGSN) 138.

In operation, when a call or connection request comes into MSC 130, the admission control table in MSC 130 is consulted with regard to the call destination point availability, e.g., MSC 132 on the other side of core network 102. Call bandwidth is accommodated and added to the total of the already existing connection loads. The call request is then admitted and routed through the network.

During periods of high user demand, the same call request is received by MSC 130, but the already existing connection loads will be consuming all the reserved bandwidth. So, a more-resources-needed request 120 is sent through MCR 104 to ABM 112 that specifies the point-to-point connection needed, e.g., SFO-NYC (San Francisco to New York City).

The ABM 112 searches through its information and routing abstractions to see if the request can be granted. If so, it updates its own view of the network bandwidth loading, and pushes down new admission tables to the affected policy enforcement points, e.g., MSC 130 and 132. The call request can then be routed through to the destination, e.g., MSC 132.

If a network failure were to occur, e.g., between MCR 104 and PE 107, an IGP network topology report 114 would document such failure to the ABM 112 in real-time. Such would cause a recalculation of all the point-to-point abstractions that depended on the link between PE 104 and PE 107. In the meantime, the core network 102 would converge as all MCR's 104-110 become aware of the failure and make their own adjustments.

If calculated as being necessary, appropriate admission control table updates 116 and 118 are independently issued by ABM 112 to all affected policy enforcement points. In FIG. 1 that would be MSC 130 and 132.

So, the ABM 112 uses the new topology that exists after the failure to determine if the network can sustain existing reservations. If yes, then no action is needed. If no, then the new reservations calculated are pushed to the relevant policy enforcement points. If availability exceeds demand, then calls stay up. Otherwise, the MGW's shed whole calls to get back down inline with their local priority algorithm limits. The nature of the application does not permit all calls to be degraded, because no call quality would then be adequate for the service being purchased.

Figure 2:
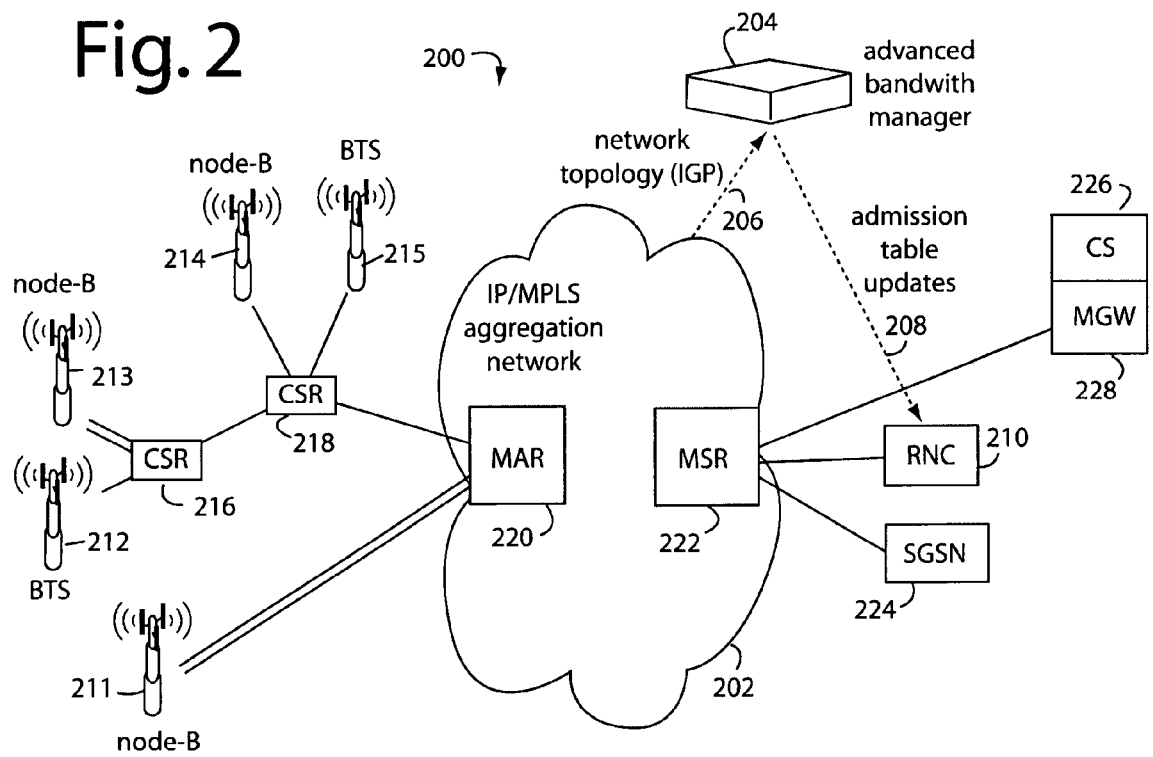
FIG. 2 is a functional block diagram of an packet-switched network embodiment of the present invention for voice in the mobile radio access network.

FIG. 2 represents a network embodiment of the present invention for voice in the Mobile Radio Access Network (RAN), and is referred to herein by the general reference numeral 200. An aggregation network 202 has an ABM 204 to monitor network routing topology IGP reports 206 and to compute from them various bandwidth reservations that are pushed down in admission table updates 208. In this application, packetized voice traffic is admitted to the RAN by a Radio Network Controller (RNC) 210. S/CAC is needed in RAN applications because large numbers of low-bandwidth "last-mile" circuits are employed.

In the TDM networks that were previously used in the Industry, the RNC's S/CAC function could be based on the number of TDM circuits existing between a particular cell site, e.g., 211-215, and RNC 210. But, aggregation network 202 does not reasonably allow the destination bandwidth to be obtained from the size or number of circuits, because using point-to-point dedicated circuits between the RNC and BTS limits the efficiency increase provided by an access network. The ABM 204 must provide admission table updates 208 computed from the routing topology information it splices together by monitoring IGP reports 206.

In operation, the voice traffic from cellular telephone node-B and base transceiver stations (BTS's) 211-215 are switched by cell site routers (CSR's) 216 and 218. A mobile aggregation router (MAR) 220 and mobile service router (MSR) 222 transport calls across network 202 first to an RNC 210 which separates the voice and data traffic, and then to an SGSN 224, CS 226, and media gateway (MGW) 228.

The ABM 204 informs the RNC 210 of the resources the RNC can use to each destination. The RNC 210 computes its current utilizations against the capacities it has available. A multi-stage approach can be employed to make more efficient use of the network 202 resources between a hub aggregation site and the RNC. In a single-stage example, an admission table on an RNC 210 located in San Francisco might look like,

| DESTINATION | CURRENT UTILIZATION | CAPACITY AVAILABLE |
|---|---|---|
| SFO.1002 | 1,200 Kbps | 3,000 Kbps |
| SFO.1003 | 1,856 Kbps | 4,500 Kbps |
| SFO.1004 | 222 Kbps | 1,000 Kbps |

The resources between hub sites and the switching office can be shared by many base stations, so admitting traffic against the shared resources in a second stage can result in a more efficient use of the available bandwidth.

A multi-stage admission table in this same example would be like,

| | | STAGE 1 (TO HUB) | | STAGE 2 (TO SITE) | |
|---|---|---|---|---|---|
| DESTINATION | HUB SITE | CURRENT UTILIZATION | CAPACITY AVAILABLE | CURRENT UTILIZATION | CAPACITY AVAILABLE |
| SFO.1002 | SFO.HUB.001 | 3,056 Kbps | 10,000 Kbps | 1,200 Kbps | 3,072 Kbps |
| SFO.1003 | | | | 1,856 Kbps | 4,608 Kbps |
| SFO.1004 | SFO.HUB.004 | 222 Kbps | 1,000 Kbps | 222 Kbps | 1,536 Kbps |

A capacity available limit is provided by the ABM 204, based on its global view of all the network demands. In this example, checks in two stages would be made for each call by the RNC 210 during call set up. In the first check, the call would be checked against the available bandwidth to the hub site. Such hub site may be connected over an Ethernet circuit running IP. In the second check, the system checks the capacity available in the last mile from the hub to the cell site.

Figure 3:
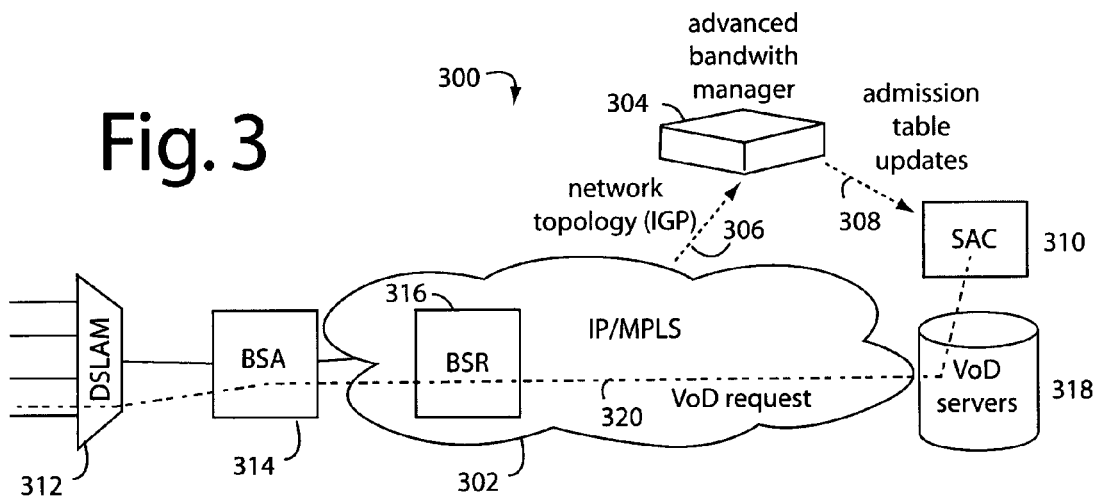
FIG. 3 is a functional block diagram of an packet-switched network embodiment of the present invention for video on demand in triple play networks.

FIG. 3 represents a network embodiment of the present invention for video on demand (VoD) in triple play networks, and is referred to herein by the general reference numeral 300. A triple play network 302 is controlled by an ABM 304 that receives network routing topology IGP reports 306. These are coordinated and bandwidth reservations are computed and pushed down in admission table updates 308, e.g., to a session admission control (SAC) 310 of a subscriber services controller (SSC). VoD requests come in from a digital subscriber line access multiplexer (DSLAM) 312 through a broadband service aggregator (BSA) 314 and to a broadband service router (BSR) 316 in the network 302. The requests make it through to VoD servers 318 and to the SAC 310.

An aggregation infrastructure for a service delivery architecture can be based, e.g., on Alcatel-Lucent 7450 ESS type BSA's, and Alcatel-Lucent 7750 SR type BSR's to form a distributed "virtual node". The BSA's do the subscriber-specific functions where the various functions scale, and the BSR's provide the routing intelligence where it is most cost-effective. Network and service scaling are achieved by dividing the Layer-2 and Layer-3 functions between the BSA and BSR and by distributing key service delivery functions. BSA's are more distributed than BSR's, cost-effectively scaling per-subscriber policy enforcement since the required functionality is distributed to lower-cost Layer-2 aggregation interfaces instead of costly router or BRAS interfaces. The BSA incorporates Internet group management protocol (IGMP) proxy multicasting and wire speed security, per-subscriber service queuing, scheduling, accounting, and filtering. The BSA is a high capacity Ethernet-centric aggregation device that supports hundreds of Gigabit Ethernet (GE) ports, tens of thousands of filter policies, and tens of thousands of queues.

BSA's forward traffic using Layer-2 mechanisms, and have the quality of service (QoS) and filtering intelligence to enforce higher-layer policies. Distribution of the QoS functionality on the BSA means that per-subscriber QoS is enforced accurately since it occurs after the last major downstream congestion point, the aggregation network. BSA's aggregate traffic for all services towards the BSR, which is an IP edge device optimized for DHCP-based video service delivery. It terminates the Layer-2 access and routes using IP over multiprotocol label switching (MPLS), with support for a full set of MPLS and IP routing protocols, including multicast routing (protocol independent multicast, sparse mode (PIM-SM)/IGMP). A BSR can support hundreds of GE and synchronous optical network (SONET) uplink ports (for large-scale deployments) and sophisticated QoS for per service and per-content/source differentiation.

BSR 316 provides service distribution routing based on guarantees required to deliver the service and associated content, rather than on individual subscribers. The BSR classifies content based on the required forwarding class for a given BSA 314, to ensure that each service's traffic receives the appropriate treatment towards the BSA.

In the BSR-to-BSA direction in which the video is flowing, IP services rely on IP layer classification of traffic from the network to queue traffic appropriately towards the BSA. Under extreme loading, which would be expected to occur during network fault conditions, lower priority data services or HSI traffic can be rolled back to protect video and voice traffic. Classification of HSI traffic based on source network address or IEEE 802.1p marking allows the QoS information to be propagated to upstream or downstream nodes by network elements.

In the BSA-to-BSR upstream direction, traffic levels are substantially lower. Class-based queuing is used on the BSA network interface to ensure that video control traffic is propagated with a minimal and consistent delay, and that preferred data and HSI services receive better treatment for upstream/peering service traffic than the best effort Internet class of service Networks, such as network 302, that are built to support triple play tend to be very high capacity, and such high capacity will usually minimize the need for S/CAC on the voice application traffic. Voice is low bandwidth but high priority.

VoD, and especially high-definition VoD, consume very large amounts of bandwidth. The VoD traffic class can therefore congest and is a prime application for S/CAC. S/CAC for VoD is most efficient when using multi-stage admission techniques. The natural policy enforcement points for triple play networks are the same points used for subscriber policy control.

In FIG. 3, admission is performed by the session admission control (SAC) 310 of the subscriber services controller (SSC). The SSC verifies for the VoD system that the subscriber is allowed to request the session. The SAC 310 checks the available network reservations to see that there is enough bandwidth available for the session. The SAC 310 gets its information on what the edge links look like from its understanding of the network topology.

The ABM 304 provides the SAC 310 with any missing links to cover the resources in the routed portion of the network. The routed portion of the network can begin at either the BSA 314 or the BSR 316, depending on the network. A sample admission table might look like,

|  |  | STAGE 1 (TO BSA) | | STAGE 2 (TO DSLAM) | |
| --- | --- | --- | --- | --- | --- |
| DESTINATION | BSR SITE | CURRENT UTILIZATION | CAPACITY AVAILABLE | CURRENT UTILIZATION | CAPACITY AVAILABLE |
| DSLAM.SFO.1002 | SFO.BSR.001 | 2,233,110 Kbps | 8,500,000 Kbps | 1,300,500 Kbps | 2,000,000 Kbps |
| DSLAM.SFO.1003 |  |  |  | 932,610 Kbps | 1,000,000 Kbps |
| PON.SFO.1004 | SFO.BSR.004 | 5,439,000 Kbps | 8,500,000 Kbps | 5,439,000 Kbps | 8,500,000 Kbps |

The capacity available limits are provided by the ABM 304 according to its global view of the network demands. VoD is an ideal application for virtual topologies. In a triple-play network, voice is usually marked above video, and video above data. Such ensures that voice will get through, regardless of the video traffic. However, VoD can consume so many resources it is possible that the VoD could entirely starve the data class. This would result in customers' data connections becoming almost useless.

Such cannot be prevented with network based class-of-service markings. Assigning a virtual topology with resources less than the physical link bandwidth will guarantee that a certain minimum bandwidth will be preserved for data traffic. ABM 304 provides such critical capability in a simple, scaleable way.

Figure 4:
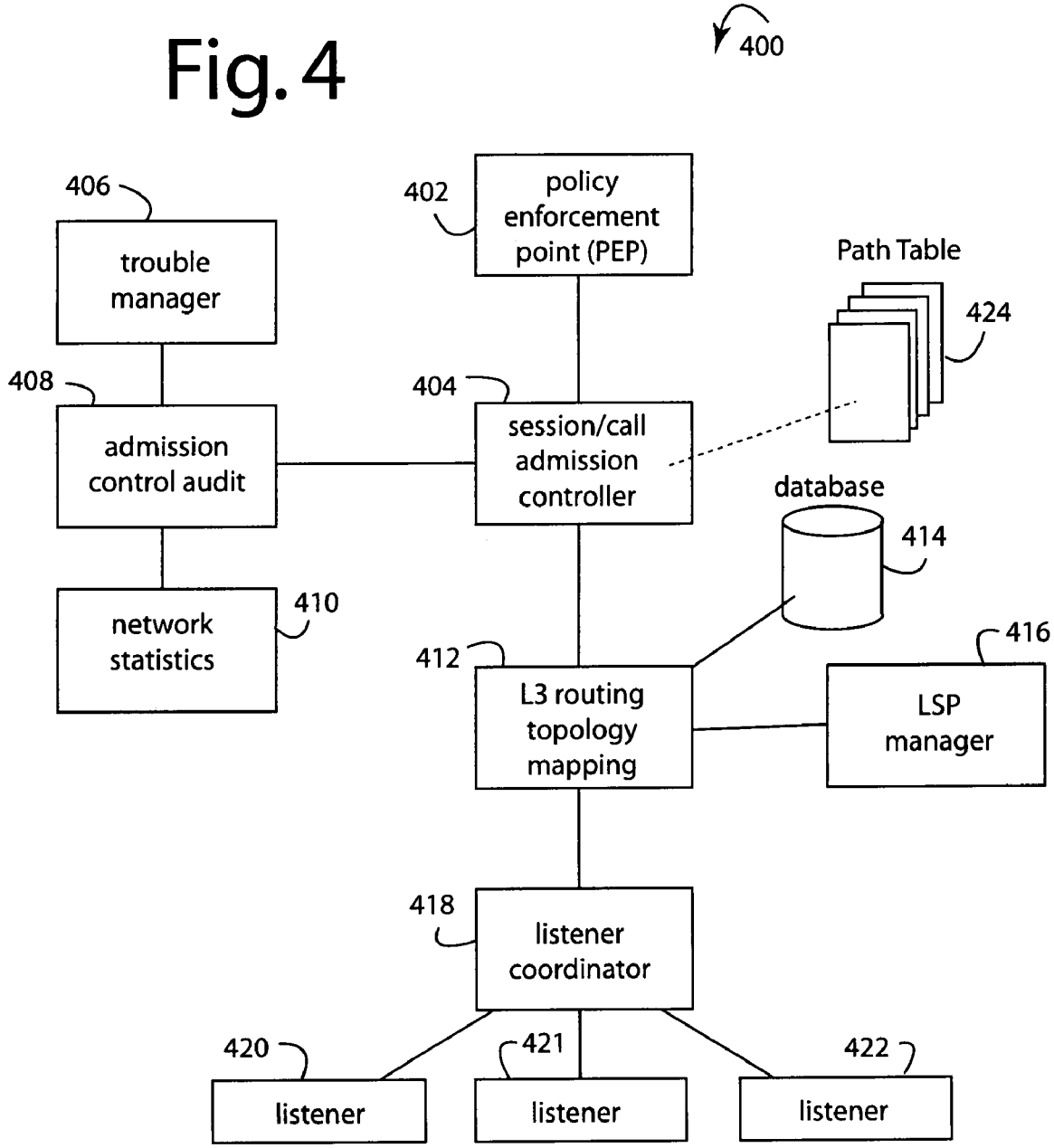
FIG. 4 is a functional block diagram of an advanced bandwidth management embodiment of the present invention.

FIG. 4 represents a bandwidth manager (BM) embodiment of the present invention, like those added to the core networks 102, 202, and 302 in FIGS. 1-3, and is referred to herein by the general reference numeral 400. The bandwidth manager 400 comprises at least one policy enforcement point (PEP) 402, a session/call admission controller (S/CAC) 404, a trouble manager 406, an admission control audit 408, a network statistics 410, a layer-3 (L3) routing topology mapping function 412, a database 414, a label switched path (LSP) manager 416, and a listener coordinator 418 connected to receive IGP reports, e.g., from a plurality of listeners 420-422. Such listeners can be similar to Alcatel-Lucent 7701 CPAA units.

The listeners 420-422 are strategically placed throughout a managed network to receive interior gateway protocol (IGP) reports, and these are distilled for the listener coordinator 418.

Listeners 420-422 should be positioned to collect all relevant knowledge of the key routing paths. Each host with a router in the network can use the routing table information to determine the next host to route a packet to for a specified destination.

The listener function participates passively in the same IGP (typically OSPF or ISIS) as the routers in the network. A link-state IGP distributes information about the nodes and links in the network to all elements participating in the protocol. If the topology of the network were to change, for example through a failure of a link or the addition of a link, the new information is flooded throughout the network via the IGP. It is this new topology information that the listener and listener coordinator uses to construct a view of the current state of the network. From this topology, the current path that packets use from each source to each destination, is constructed.

In operation, during a network failure, an IGP report will come into one or more of the listeners 420-422 that will inform the ABM 400 of the details of the failure. The results are coordinated by listener coordinator 418 to present a single view of the network to L3 routing topology mapping function 412 for calculation. If present, RSVP-TE LSP information is added to the calculation by LSP manager 416. RSVP-TE is a signaling protocol that can be used to specify fully or partly explicit paths through the network. These paths can be used to override the shortest path computed by the IGP.

A path table 424 is calculated from the IGP and/or RSVP information and represents a full matrix of all the paths in the routed network, and is passed to the S/CAC 404. Path table information is stored in the database 414 for future analysis. Each path defines all the links in a particular routing through the constituent edge and core routers.

The path table 424 is used by the S/CAC module to determine if the change in the network will have an impact on the reservations it is controlling.

In a steady state, the network is designed to handle the reservations required to support its operation. However, when the network changes, either through failure or a growth in demand for reservations, the S/CAC module may realize that the reservations, as listed, are congesting the bandwidth available in the network. In this case, the S/CAC 204 invokes a fairness/cleverness algorithm. For example, see Table-I.

TABLE I fairness/cleverness algorithm example

A reservation A to B takes a link path, A-R-L-D-B.
> A change in the network causes link A-R to have 100 fewer units of bandwidth available to it. Formerly it supported 250 units, now it support 150 units.
> PATH table reveals link A-R is also used by demands AB and AC.
> Query PEP A for the actual utilization of AB and AC.
> Example responses, AB 90/100, AC 70/150.
> Compute needed bandwidth (RESV-CAP = 100).
> Compute free bandwidth (AB = 10, AC = 80).
> Divide reservation reduction between paths in minimally intrusive way, e.g., needed bw (100) − free bw = total reduction (TRR) (10). TRR (10) / number of demand pairs (2) = TRR per demand (5). BW adjustment = free bandwidth + TRR per demand.
> Adjust reservations for AB and AC demands (AB 100 -> 85, AC 150 -> 65). This causes only 5 units worth of dropped calls per demand.
> Push reservations to PEP's 402.

Short-term network demand growth can often be immediately accommodated because new bandwidth increases are implemented in coarse steps up during each capital expenditure. Such overcapacity helps meet current peak demands. For example, adding a same capacity link yields a two fold increase in bandwidth. Moving the equipment up the SONET/SDH hierarchy provides a four fold step up. Moving up the Ethernet hierarchy provides a ten fold increase. The extra capacity is held by ABM 400 in a pool that can be allocated to PEP's as needed to accommodate their respective growing needs.

The admission control audit 408 catches traffic class misconfigurations. All traffic in certain classes must be under appropriate admission control, otherwise congestion and degradation of service would occur. The Audit function also uses the actual statistics it gathers from the network through a network stats function. It is by comparing the reservations with the real utilization that it can detect anomalies. These links are identified with the help of the S/CAC module 404.

The network statistics 410 periodically collects statistics from the network. Per-class traffic statistics are collected from all intermediate links. Per-class traffic statistics are gathered from all access links. A link reservation matrix from the S/CAC 404 is used to identify these links. If the utilization exceeds the reservations (UTIL>RESV), then an alarm is sent to get such traffic under admission control. Only links listed in the path table 424 should be passing particular traffic classes into the network. If traffic in a particular traffic class is being injected into the network that should not be, or a node that should be under admission control is not, then an alarm is sent to correct the situation. The links listed in the path table 424 should include all relevant nodes in the network.

Network 100 and bandwidth manager 400 implement a complete end-to-end QoS solution. Network signalling is not affected, and component failure in bandwidth manager 400 does not result in a loss of service. So the implementations are stable. Easy scaling is provided by distributed admission controls. Network 100 and bandwidth manager 400 are application aware, e.g., voice and VoD can take appropriate action to ensure end-user quality of experience. Virtual topologies and policy control account for operators' business needs and therefore provide flexibility. Changes in the network are accommodated automatically by the architecture.

The S/CAC 404 analyzes all the reservation demands and admits reservations based on the available bandwidth in the core network, e.g., 102 in FIG. 1. It distributes an allocation matrix to all the involved media gateways (MGW's). The information describes how much bandwidth is reserved for a particular MG to communicate with other MGW's. Each MGW manages its allocated bandwidth internally, and will not allow sessions beyond the reservation.

For every active bandwidth reservation, the S/CAC 404 maintains information for a Unique Identifier provided by the MGW at the time of setup, a Source media gateway (MGW), a Source provider edge (PE), a Destination MGW, a Destination PE, an Owner MGW, a Bandwidth requirement, a Session Type: Application type, and an Expiry Time: Time/Date at which a session will be deallocated.

Bandwidth reservation admission comprises a data path search, and a bandwidth availability check. This differs from ATM/TDM admission control systems where the end-to-end connection also needs to be set up. In an IP-based network, the data path has already been determined based on the routing protocol, regardless of the utilization of the network. S/CAC 404 relies on the L3 routing topology mapping function 412 to search for and calculate the shortest path between two PEP's within the managed network. The data path search result is returned in the form of ordered list (in path table 424) of all the involved network segments, e.g., as identified by links/nodes.

For data path management, the IP-based core network routers can be divided into provider edge (PE) and provider (P) routers based on the functionality. Media gateways are connected on the edge of the network to the PE. If all the MGW's had to be connected to all the other MGW's, then the number of reservations that would have to be generated would approach the square of the number of media gateways involved. Clearly, the practicality of this diminishes as the network grows in size.

But all the possible paths in the network do not need to be monitored, so the S/CAC 404 registers for notifications on specific network paths, as identified by source and destination PE's. As a result, any changes or reroutes are included in the notifications that will be issued. In the case of a network event that triggers change to a registered path, update path or "path unavailable" indicators are communicated if the network event resulted in a disconnection in the route.

Bandwidth reservation requests can be submitted as individual requests or as a bulk request (Demand Matrix) by the PEP. A reservation request includes all the information needed to setup a reservation between two different MGW's. The request initiator can be a higher system (OSSI API), System administrator (GUI, scripts), or the media gateway itself. Individual bandwidth reservation requests include a Unique Identifier provided by the MGW at the time of setup, a Source MGW, a Source PE, a Destination MGW, a Destination PE, an Owner MGW, a Bandwidth requirement, a Reservation Length, and an Application Type. Each reservation request return includes a Return code to indicate success or failure, a Reason code to further identify the reason of failure, an Offered bandwidth in case of not being able to satisfy the original request, and a Session description: Reservation Descriptor.

Figure 5:
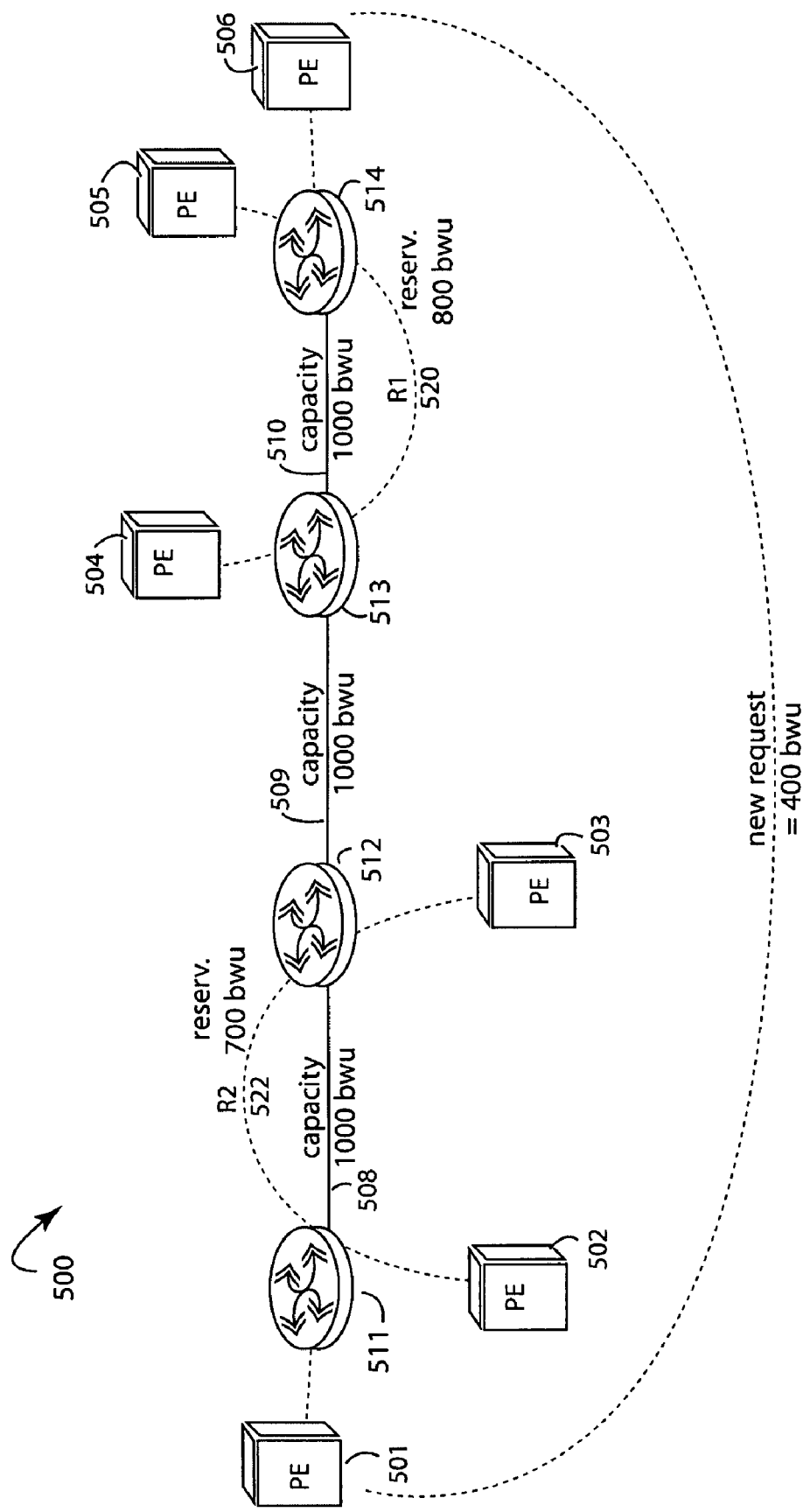
FIG. 5 is a functional block diagram of a four-hop network segment that is used to help explain strict and adaptive admission algorithms.

FIG. 5 represents how a strict reservation admission algorithm embodiment of the present invention would function in admitting new calls and re-admitting rerouted calls. A four-hop segment 500 of a network supports provider edges (PE's) 501-506. A first phase, the path search, uses L3 routing topology mapping function 412 to figure out the shortest path between the provider edges involved, and four-hop segment 500 between PE 301 and PE 506 was entered into path table 424. In a second phase, all the involved segments 508-510 between routers 511-514 are inspected to determine their respective bandwidth availabilities. Many different kinds of admission algorithms are possible, some will be better than others for particular applications.

In the example of FIG. 5, the capacity set on each of three links 508-510 is 1000 BW-units (bwu). There are two existing reservations, R1 520 between PE 504 and PE 505 for 800 BW-units, and R2 522 between PE 502 and PE 503 for 700 BW-units. These share parts of the four-hop segment 500. To further illustrate the admission algorithm, assume a new request to be admitted requires 400 BW-units from PE 501 to PE 506. Inspecting links 508-510 reveal that there are 300-1000-200 BW-units available, respectively. The admission will be rejected because the minimum link with 400 available BW-units is less than the 400 BW-units needed.

In a next example for an adaptive reservation admission algorithm, suppose the applications are actually using less than what was originally reserved. If an interrogation of the media gateways revealed R1 520 was actually using 500 BW-units, and R2 522 was consuming 500 BW-units, then a reservation update procedure could be kicked in to adjust R1 520 and R2 522. The new reservations would then allow the accommodation of the previous example's 400 BW-unit request between PE 501 and PE 506. When a media gateway responds to an actual utilization query, it should answer with near future usages factored in to avoid having to immediately initiate another reservation update.

Initially in the network, an adaptive reservation admission algorithm would allow the engineered reservation numbers to converge to real numbers, and after a while an operator could switch a strict reservation admission. Media gateways would not be involved with strict reservation admission, as the admission decision will be based on the S/CAC 404 view of the utilization which is identical to the reservation view. Each media gateway should be able to be interrogated for actual utilization numbers to adjust the reservation numbers when using adaptive reservation admission. The S/CAC 404 can offer a combination of the two algorithms by adding strict flag to the reservation descriptor, and apply adaptive reservation admission. When the strict flag is enabled, the actual utilization can be assumed to be equal to the reservation.

A network's core and edges typically comprise preexisting installations and interconnections, and to this are added various control mechanism embodiments of the present invention. The mechanisms added to manage the network preferably should not affect the inherent stability of the network. Such mechanisms should be able scale up with the applications and the network, without excessive or unusual costs involved. Each application whose resources are being denied or throttled is made aware that its needs are being affected so it can choose some alternative, e.g., standard video in lieu of high definition. Service operators' business needs and policies need to be strictly accommodated. Such mechanisms should be able to bridge the entire network life cycle so QoS can be ensured across the whole operational life-time.

In general, network embodiments of the present invention comprise components that combine to form an Advanced Bandwidth Management Architecture. These components together manage the loading of a network. They cooperatively intervene to prevent degradation of application quality when a network nears or exceeds its capacity due to changes in the network, e.g., component failures of incremental growth. The functional components typically comprise a path determination subsystem, an S/CAC function, a PEP function, and an audit function. The several components can be marketed and packaged together as a single product or set of products.

The path determination subsystem determines the current path that traffic is taking in the network. It consists of a listener, which determines the current topology of the network by passively participating in the network's IGP; an LSP manager, which is only required if there exist other paths, such as MPLS traffic engineered paths, that might change the path that data takes between two end points in the network; and, a L3 topology mapping function, which coordinates information such that a consistent and accurate picture of the paths traffic takes in the network is presented to the S/CAC function. A database function for storing topology and path information for analysis is optional.

The listener function can be constructed of separate components. The listener itself, which maintains IGP state with one or more routers in the network. Multiple listeners may exist to either provide redundancy, or cover especially large or complex networks. If multiple listeners are present a listener coordinator function exists to bring the information gathered together and present a single view to the L3 routing and topology function.

The S/CAC function takes information from the path determination subsystem and information about the reservations in the network and determines if there network can support the desired reservations. It informs the PEP's of their bulk point-to-point reservations. The S/CAC function handles changes to reservations required if there is a change in the network due to a failure, new resources, or change in the topology of the network, or a growth in demand.

The PEP function, informed by the S/CAC function, performs the actual admission of individual flows. Many devices can perform the PEP function. E.g., 1) A media gateway (MGW) in a mobile core network, 2) A radio network controller (RNC) in a mobile access network, 3) a SIP proxy, 4) a video-on-demand controller in a video network, or 5) a session admission control manager in a video-on-demand network.

The audit function exists to catch potential error or misconfigurations that could compromise the effectiveness of the system as a whole. It consists of three sub-functions: 1) Network statistics gathering, which collects information from the network that reflects what is actually going on, 2) The audit function itself, which compares the network statistics view of what is happening in the network with the S/CAC function's view of what ought to be happening in the network, and 3) The trouble management function, which reports any errors to the operator of the network for correction.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A system for providing quality of service (QOS) in a network, comprising:
   at least one remote listener to gather interior gateway protocol (IGP) reports about how traffic is being routed over the whole network;
   an advanced bandwidth manager (ABM) to manage loading when an attached network nears or exceeds its capacity due to component failures, incremental growth, and other changes in the network, the advanced bandwidth manager comprising a processor for abstracting the routing information gathered by remote listeners into point-to-point admission control tables and pushing the admission control tables to at least one edge of the network; and
   at least one policy enforcement point (PEP) attached to the at least one edge of the network and configured to autonomously control admission of network ingress traffic at said at least one PEP based on the admission control tables
   wherein the admission control tables are stored locally on the at least one PEP and used by the at least one PEP to implement long-term traffic admission controls that differentiate between traffic classes, and the admission control tables are automatically updated by the ABM and downloaded by the at least one PEP in response to a change in packet-switched network topology or bandwidth reservation capacity due to a network failure.

2. The system of claim 1, wherein the at least one PEP comprises:
   a processor for downloading the admission control tables based in the point-to-point abstractions.

3. The system of claim 1, further comprising:
   a processor for keeping the highest level of service up for the most users and to prevent total failures.

4. The system of claim 1, further comprising:
   a processor for interrogating media gateways about their current bandwidth utilizations;
   a processor for comparing reported bandwidth utilizations to those reserved; and
   a processor for re-adjusting media gateway reservations to more closely approximate their actual bandwidth utilizations.

5. The system of claim 4, further comprising:
a processor for accommodating new traffic that would otherwise not be admitted by triggering the processor for interrogating media gateways about their current bandwidth utilizations, and then reserving newly available bandwidth for said new traffic.

6. The system of claim 1, further comprising:
a processor for admission control based on class of traffic.

7. The system of claim 1, further comprising:
a processor for coordinating multiple passive IGP listeners.

8. The system of claim 1, further comprising:
a processor for coordinating IGP-generated path information and RSVP path information to present a single view of the network based on the IGP-generated path information and the RSVP path information.

9. The system of claim 1, further comprising:
an Internet protocol/multiprotocol label switching (IP/MPLS) core network.

10. The system of claim 1, further comprising:
a processor for fairly distributing required reductions in reservations due to network change to an affected PEP.

11. The system of claim 1, further comprising:
a processor for interpreting reservation requests, wherein the reservation requests are requests from the at least one PEP to the ABM for an increase in an amount of allocated bandwidth to a certain destination.

12. The system of claim 1, further comprising:
a processor providing for PEP queries of the ABM that negotiate for additional bandwidth resources.

* * * * *